Patented Sept. 1, 1925.

1,551,638

UNITED STATES PATENT OFFICE.

PETER H. BRADY, OF SPOKANE, WASHINGTON, ASSIGNOR TO THE SOMISH COMPANY, OF SPOKANE, WASHINGTON, A CORPORATION OF WASHINGTON.

DENTAL CREAM OR PASTE.

No Drawing.  Application filed January 6, 1925.  Serial No. 864.

*To all whom it may concern:*

Be it known that I, PETER H. BRADY, a citizen of the United States, residing at Spokane, in the county of Spokane and State of Washington, have invented certain new and useful Improvements in Dental Creams or Paste, of which the following is a specification.

This invention relates to dental creams or paste.

An important object of the invention is to provide a dental cream embodying Soap Lake salts or a salt produced by the evaporation of the waters of Soap Lake in Grant County, in the State of Washington. These salts have been found exceedingly beneficial to clean the teeth as they have the property of removing soreness from the gums and check bleeding of the gums. These salts are, however, not marketable in their natural state as a dentifrice due to the facts that they have a very disagreeable taste, contain an excess of alkali and the form in which they are produced is very crude.

I accordingly combine with the Soap Lake salts above mentioned ingredients such that the taste is disguised and the excess of alkali overcome and a smooth, clean paste produced which is capable of withstanding climatic conditions. To this paste is added such other ingredients known to be of value in the treatment of oral diseases as are found desirable.

As an example of a tooth paste constructed in accordance with my invention, the following proportions are given for one thousand parts of the tooth paste:—

|  | Grams. |
|---|---|
| Soap Lake salts | 100. |
| Water | 310.8 |
| Cocoanut oil | 40. |
| Peach kernel oil | 40. |
| Glycerin | 50. |
| Fluid extract ipecac | 4. |
| Formalin | .2 |
| Saccharin | 2. |
| Oil peppermint | 2. |
| Menthol | 2. |
| Methyl salicylate | 4. |
| Oil clove | .5 |
| Oil cinnamon | .5 |
| Alcohol | 15. |
| Powdered tragacanth | 10. |
| Calcium carbonate | 410. |

These ingredients are mixed as follows: The Soap Lake salts are dissolved in three hundred parts of the water and filtered. The cocoanut oil is melted and strained and mixed with the peach kernel oil and glycerin. This mixture of oils and glycerin is added to the solution of Soap Lake salts and at a temperature of 125° F., after which the mixture is heated and brought to a boiling point and maintained at this point for one hour. During this boiling, any water lost through the evaporation is replaced.

By the above treatment which is substantially the carbonate method of saponification, a chemical reaction takes place between the sodium carbonate of the Soap Lake salts and the fatty acids of the oils and there are formed sodium stearate, oleate and palmitate, a portion of the oils remaining still unsaponified. This portion is emulsified as hereinafter set forth.

The menthol, oil of peppermint, methyl salicylate, oil of cloves, and oil of cinnamon are dissolved in the alcohol and added to the above mixture while hot. The mixture is then allowed to cool to 125° F. and at this temperature, the fluid extract of ipecac, formalin and saccharin, previously dissolved in 10.8 parts of water, are added. The powdered tragacanth and calcium carbonate are then incorporated with the above mixture by mixing for one hour in a mixing machine. This mixture emulsifies the uncombined oils above mentioned and the paste is then ready for use and may be placed in the usual containers for this purpose.

In order that my invention may be more fully understood, it is pointed out that the Soap Lake salts contains sodium carbonate, sodium chloride and sodium sulphate in relatively large amounts. The exact proportions of these ingredients and of the remaining ingredients are fully set forth in the U. S. Government Analysis of Soap Lake Salts by H. G. Knight in Water Supply Papers, No. 111, Series O, Underground Waters 29. Of the ingredients above listed, the Soap Lake salts provide an antiseptic, anodyne, hæmostatic, and antacid. The water serves the purpose of dissolving salts and saccharin, the cocoanut oil and peach kernel oil are employed to saponify the solution of Soap Lake salts and overcome the alkaline excess, and the glycerin is employed to prevent hardening of the paste and as an antiseptic. The fluid extract ipecac and formalin are employed respectively as a hæmostatic and an antiseptic. The saccharin, oil of peppermint, menthol, methyl salicylate, oil of cloves, oil of cinnamon and alcohol are employed for sweetening and flavoring, the alcohol being employed to dissolve the menthol and flavoring oils and to hold the same in solution. The flavoring oils employed may be any selected oils, but are preferably such as listed above having anodyne properties. The powdered tragacanth adds body to the paste and assists in emulsifying and bonding the produce. Calcium carbonate is employed both as an abrasive and an antacid.

It will, of course, be obvious that many of the ingredients above employed are capable of substitution, replacement or of omission. The cocoanut and peach kernel oils may be substituted by any of the fatty oils which will emulsify the solution of the salts and overcome the alkaline excess. The fluid extract of ipecac and formalin may be substituted by other suitable hæmostatics or antiseptics. Further, while a specific abrasive and antacid is employed in calcium carbonate, it will be obvious that this ingredient may be readily substituted by a number of similar substances and I accordingly do not limit myself to the specific ingredients or proportions above mentioned except as herinafter claimed.

I claim:—

1. A base for a tooth paste comprising a solution of Soap Lake salts saponified in combination with suitable oils overcoming the alkaline excess of the salts.

2. A base for a tooth paste comprising a solution of Soap Lake salts saponified by cocoanut and peach kernel oils.

3. A base for a dentifrice comprising Soap Lake salts, water, and cocoanut and peach kernel oils mixed and saponified, in the following proportions: Soap Lake salts, one hundred parts, water three hundred parts, coacoanut oil forty parts and peach kernel oil forty parts.

4. A base for a dentifrice comprising Soap Lake salts, water, and cocoanut and peach kernel oils mixed and saponified with the addition of flavoring and sweetening ingredients.

5. A base for a dentifrice comprising Soap Lake salts, water and cocoanut and peach kernel oils mixed and saponified with the addition of flavoring and sweetening ingredients, the oils being provided in excess and a bonding body emulsified with the excess of oils.

In testimony whereof I hereunto affix my signature.

PETER H. BRADY.